(12) United States Patent
Holden et al.

(10) Patent No.: US 12,122,073 B2
(45) Date of Patent: Oct. 22, 2024

(54) METHODS AND SYSTEMS FOR CURING COMPOSITES AND ASSOCIATED MICROCRACK-RESISTANT COMPOSITES

(71) Applicant: The Boeing Company, Chicago, IL (US)

(72) Inventors: George Holden, Melbourne (AU); Benjamin P. Adamson, Melbourne (AU); Christopher A. Howe, Port Melbourne (AU)

(73) Assignee: The Boeing Company, Arlington, VA (US)

(*) Notice: Subject to any disclaimer, the term of this patent is extended or adjusted under 35 U.S.C. 154(b) by 134 days.

(21) Appl. No.: 17/245,153

(22) Filed: Apr. 30, 2021

(65) Prior Publication Data

US 2021/0387382 A1 Dec. 16, 2021

Related U.S. Application Data

(60) Provisional application No. 63/037,062, filed on Jun. 10, 2020.

(51) Int. Cl.
*B29C 35/02* (2006.01)
*B29K 63/00* (2006.01)
*B29K 101/12* (2006.01)
*B29K 307/04* (2006.01)

(52) U.S. Cl.
CPC ...... *B29C 35/0288* (2013.01); *B29K 2063/00* (2013.01); *B29K 2101/12* (2013.01); *B29K 2307/04* (2013.01)

(58) Field of Classification Search
CPC ............ B29C 35/0288; B29C 35/0294; B29C 35/007; B29C 70/443
USPC ........................................ 264/345
See application file for complete search history.

(56) References Cited

U.S. PATENT DOCUMENTS

| | | | |
|---|---|---|---|
| 4,913,937 A | 4/1990 | Engdahl et al. | |
| 7,041,740 B2* | 5/2006 | Martin | C08J 5/04 525/197 |
| 8,246,882 B2 | 8/2012 | Tsotsis | |
| 8,613,257 B2 | 12/2013 | Wockatz | |
| 8,652,371 B2* | 2/2014 | Smith | B29C 70/544 264/241 |
| 8,852,713 B2 | 10/2014 | Tsotsis | |

(Continued)

FOREIGN PATENT DOCUMENTS

| | | |
|---|---|---|
| CA | 2484174 | 12/2003 |
| EP | 2356272 | 8/2011 |
| WO | WO2001041993 | * 1/2002 |

OTHER PUBLICATIONS

European Patent Office, Extended European Search Report, App. No. 21173126.0 (Oct. 25, 2021).

*Primary Examiner* — Michael A Tolin
*Assistant Examiner* — Hana C Page
(74) *Attorney, Agent, or Firm* — Walters & Wasylyna LLC

(57) ABSTRACT

A method for curing a composite including a thermoset resin, a reinforcement material and a thermoplastic additive, the thermoplastic additive having a melt onset temperature, the method including heating the composite to increase a resin temperature of the thermoset resin and, during the heating, controlling the resin temperature such that the resin temperature exceeds the melt onset temperature prior to the thermoset resin achieving a degree of cure of 98 percent.

20 Claims, 11 Drawing Sheets

(56) References Cited

U.S. PATENT DOCUMENTS

| | | |
|---|---|---|
| 10,081,722 B2 | 9/2018 | Meure et al. |
| 2004/0113317 A1 | 6/2004 | Healey et al. |
| 2005/0197023 A1 | 9/2005 | Woolstenroft |
| 2006/0027314 A1 | 2/2006 | Jones et al. |
| 2016/0089853 A1 | 3/2016 | Meure et al. |
| 2016/0354994 A1 | 12/2016 | Meure et al. |
| 2017/0136661 A1* | 5/2017 | Shome ................ B29C 35/0266 |
| 2020/0207034 A1 | 7/2020 | Meure et al. |

* cited by examiner

METHODS AND SYSTEMS FOR CURING COMPOSITES AND ASSOCIATED MICROCRACK-RESISTANT COMPOSITES

PRIORITY

This application claims priority from U.S. Ser. No. 63/037,062 filed on Jun. 10, 2020.

FIELD

This application relates to curing of composites, such as carbon fiber reinforced plastics, and, more particularly, to the curing of thermoplastic-toughened thermoset polymer-matrix composites.

BACKGROUND

Fiber-reinforced thermoset polymer-matrix composites, such as carbon fiber-reinforced plastics, tend to exhibit high strength at relatively light weight. Therefore, such fiber-reinforced thermoset polymer-matrix composites are commonly used for various applications (e.g., structural applications) throughout the aerospace industry, as well as in other industries (e.g., automotive and marine).

It has been known for some time that fiber-reinforced thermoset polymer-matrix composites can be enhanced by incorporating therein various thermoplastic additives. For example, interlayers containing thermoplastic filaments have been incorporated between the reinforcing layers of carbon fiber reinforcement materials to increase the toughness of the resulting fiber-reinforced thermoset polymer-matrix composites.

During a thermal cure cycle, the expansion and contraction of the constituents within a composite can cause variations in applied stress across the materials, which can lead to microcracking. Such microcracking tends to occur within the thermoset polymer-matrix, particularly at the interface between the resin and the reinforcement material and the interface between the resin and the thermoplastic additives.

Accordingly, those skilled in the art continue with research and development efforts focused on the curing of composites.

SUMMARY

Disclosed are methods for curing a composite that includes a thermoset resin, a reinforcement material, and a thermoplastic additive. The thermoplastic additive has a melt onset temperature.

In one example, the disclosed method includes heating the composite to increase a resin temperature of the thermoset resin and, during the heating, controlling the resin temperature such that the resin temperature exceeds the melt onset temperature prior to the thermoset resin achieving a degree of cure of approximately 100 percent.

In another example, the disclosed method includes heating the composite to increase a resin temperature of the thermoset resin and, during the heating, controlling the resin temperature such that the resin temperature exceeds the melt onset temperature prior to the thermoset resin achieving a degree of cure of 98 percent.

In another example, the disclosed method includes steps of: (1) positioning into an oven a preform comprising the reinforcement material and the thermoplastic additive; (2) infusing the thermoset resin into the preform to yield a resin-infused preform; (3) heating the resin-infused preform to increase a resin temperature of the thermoset resin; and (4) during the heating, controlling the resin temperature such that the resin temperature exceeds the melt onset temperature while the thermoset resin comprises a degree of cure between about 5 percent and about 85 percent.

Also disclosed are systems for curing a composite that includes a thermoset resin, a reinforcement material, and a thermoplastic additive. The thermoset resin has a resin temperature and the thermoplastic additive has a melt onset temperature.

In one example, the disclosed system includes an oven having an oven temperature, a first temperature sensor positioned to sense the oven temperature, a tool positioned in the oven, the tool defining a tool surface for supporting the composite thereon, a vacuum bag coupled with the tool to define an infusion volume therebetween, a resin source fluidly coupled with the infusion volume for supplying the thermoset resin to the infusion volume, a second temperature sensor positioned to sense the resin temperature of the thermoset resin in the infusion volume, and a controller in communication with the first temperature sensor, the second temperature sensor and the oven, wherein the controller controls the resin temperature of the thermoset resin in the infusion volume such that, during curing of the composite, the resin temperature of the thermoset resin in the infusion volume exceeds the melt onset temperature prior to the thermoset resin achieving a degree of cure of about 85 percent.

Also disclosed are microcrack-resistant composites that are manufactured using the disclosed methods and systems.

Other examples of the disclosed methods and systems for curing composites and associated microcrack-resistant composites will become apparent from the following detailed description, the accompanying drawings and the appended claims.

DETAILED DESCRIPTION

Figure 1:
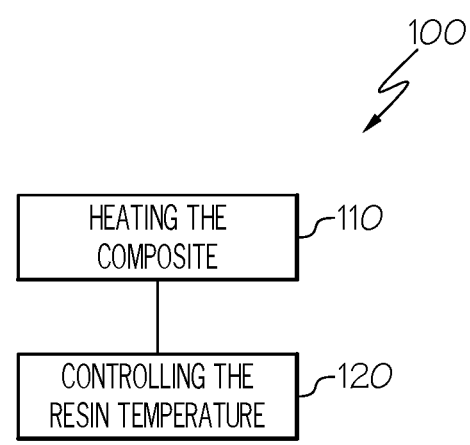
FIG. 1 is a flow diagram depicting one example of the disclosed method for curing a composite.

The following detailed description refers to the accompanying drawings, which illustrate specific examples of the disclosure. Other examples having different structures and operations do not depart from the scope of the present disclosure. Like reference numerals may refer to the same element or component in the different drawings.

Figure 2:
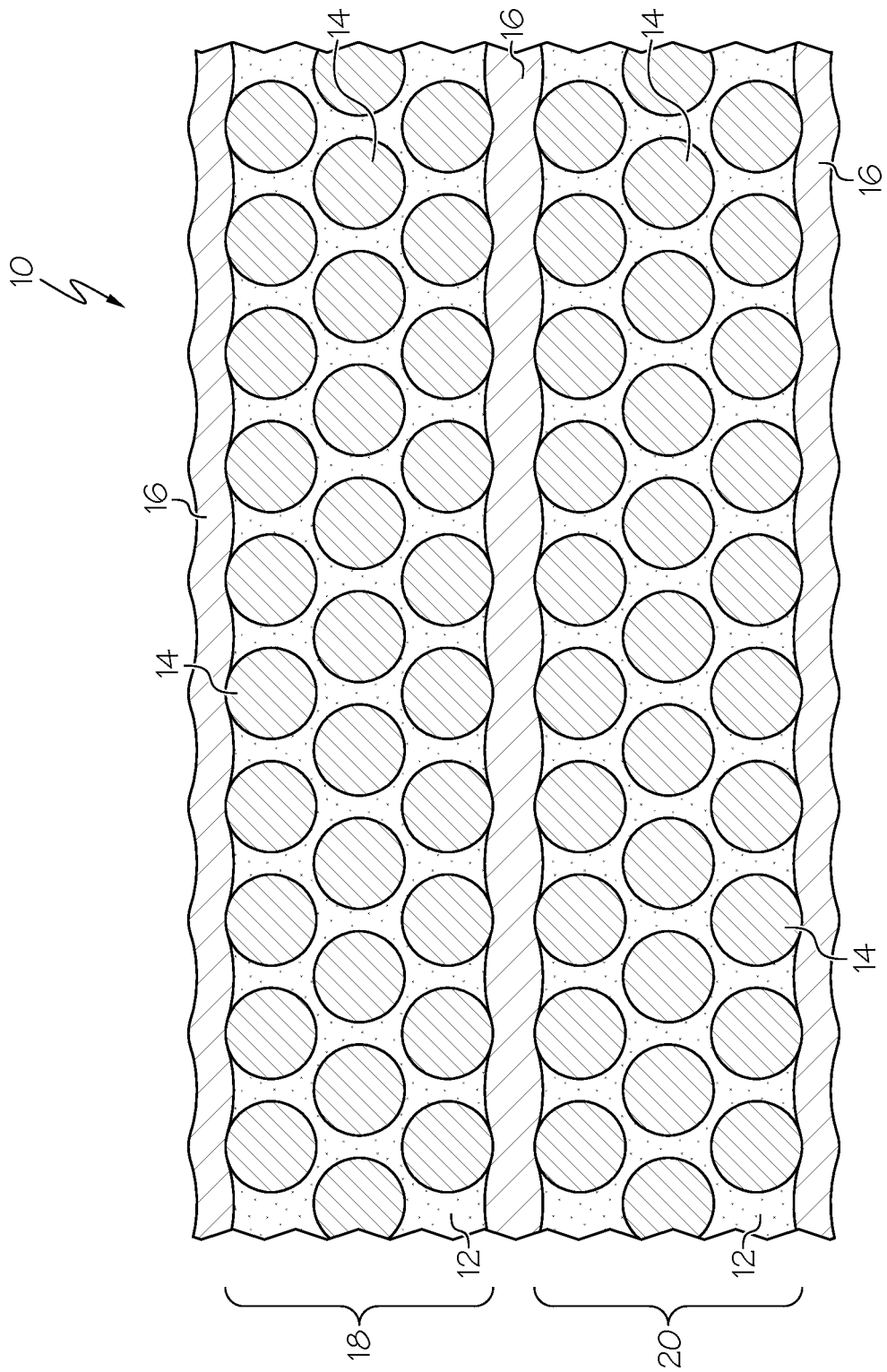
FIG. 2 is a schematic cross-sectional view of a composite that may be manufactured using the method of FIG. 1.

Referring to FIG. 1, shown is a flow diagram depicting one example of the disclosed method 100 for curing a composite 10 (FIG. 2). As shown in FIG. 2, the composite 10 may include a thermoset resin 12, a reinforcement material 14 and a thermoplastic additive 16. The thermoset resin 12 has a resin temperature ($T_R$). The thermoplastic additive 16 has a melt onset temperature ($T_{eim}$). As used herein, melt onset temperature ($T_{eim}$) means the extrapolated melting onset temperature, as determined in accordance with ASTM D3418.

As shown at Block 110, the method 100 may include the step of heating the composite 10 to increase a resin temperature ($T_R$) of the thermoset resin 12. The heating (Block 110) may be performed by positioning the composite 10 into the internal volume 304 of an oven 302, such as the oven 302 shown in FIG. 9.

As shown at Block 120, the method 100 may further include the step of controlling the resin temperature ($T_R$) such that the resin temperature ($T_R$) exceeds the melt onset temperature ($T_{eim}$) prior to the thermoset resin 12 achieving a degree of cure ($D_C$) of approximately 100 percent (i.e., greater than or equal to 98 percent). The controlling (Block 120) may be performed during the heating (Block 110), such as by a controller, such as the controller 350 shown in FIG. 9.

In one particular example, the controlling (Block 120) the resin temperature ($T_R$) may include controlling the resin temperature ($T_R$) such that the resin temperature ($T_R$) exceeds the melt onset temperature ($T_{eim}$) prior to the thermoset resin 12 achieving a degree of cure ($D_C$) of about 85 percent. In another particular example, the controlling (Block 120) the resin temperature ($T_R$) may include controlling the resin temperature ($T_R$) such that the resin temperature ($T_R$) exceeds the melt onset temperature ($T_{eim}$) prior to the thermoset resin 12 achieving a degree of cure ($D_C$) of about 80 percent. In another particular example, the controlling (Block 120) the resin temperature ($T_R$) may include controlling the resin temperature ($T_R$) such that the resin temperature ($T_R$) exceeds the melt onset temperature ($T_{eim}$) prior to the thermoset resin 12 achieving a degree of cure ($D_C$) of about 75 percent. In another particular example, the controlling (Block 120) the resin temperature ($T_R$) may include controlling the resin temperature ($T_R$) such that the resin temperature ($T_R$) exceeds the melt onset temperature ($T_{eim}$) prior to the thermoset resin 12 achieving a degree of cure ($D_C$) of about 70 percent. In another particular example, the controlling (Block 120) the resin temperature ($T_R$) may include controlling the resin temperature ($T_R$) such that the resin temperature ($T_R$) exceeds the melt onset temperature ($T_{eim}$) prior to the thermoset resin 12 achieving a degree of cure ($D_C$) of about 60 percent. In another particular example, the controlling (Block 120) the resin temperature ($T_R$) may include controlling the resin temperature ($T_R$) such that the resin temperature ($T_R$) exceeds the melt onset temperature ($T_{eim}$) prior to the thermoset resin 12 achieving a degree of cure ($D_C$) of about 50 percent. In another particular example, the controlling (Block 120) the resin temperature ($T_R$) may include controlling the resin temperature ($T_R$) such that the resin temperature ($T_R$) exceeds the melt onset temperature ($T_{eim}$) prior to the thermoset resin 12 achieving a degree of cure ($D_C$) of about 40 percent. In another particular example, the controlling (Block 120) the resin temperature ($T_R$) may include controlling the resin temperature ($T_R$) such that the resin temperature ($T_R$) exceeds the melt onset temperature ($T_{eim}$) prior to the thermoset resin 12 achieving a degree of cure ($D_C$) of about 30 percent. In yet another particular example, the controlling (Block 120) the resin temperature ($T_R$) may include controlling the resin temperature ($T_R$) such that the resin temperature ($T_R$) exceeds the melt onset temperature ($T_{eim}$) prior to the thermoset resin 12 achieving a degree of cure ($D_C$) of about 20 percent.

The controlling (Block 120) the resin temperature ($T_R$) may include controlling the resin temperature ($T_R$) such that the resin temperature ($T_R$) exceeds the melt onset temperature ($T_{eim}$) only after the thermoset resin 12 achieves a degree of cure ($D_C$) of about 1 percent. In one particular example, the controlling (Block 120) the resin temperature ($T_R$) may include controlling the resin temperature ($T_R$) such that the resin temperature ($T_R$) exceeds the melt onset temperature ($T_{eim}$) only after the thermoset resin 12 achieves a degree of cure ($D_C$) of about 5 percent. In yet another particular example, the controlling (Block 120) the resin temperature ($T_R$) may include controlling the resin temperature ($T_R$) such that the resin temperature ($T_R$) exceeds the melt onset temperature ($T_{eim}$) only after the thermoset resin 12 achieves a degree of cure ($D_C$) of about 10 percent.

The controlling (Block 120) the resin temperature ($T_R$) may include controlling the resin temperature ($T_R$) such that the resin temperature ($T_R$) exceeds the melt onset temperature ($T_{eim}$) while the thermoset resin 12 has a degree of cure ($D_C$) between about 5 percent and about 80 percent. In one particular example, the controlling (Block 120) the resin temperature ($T_R$) may include controlling the resin temperature ($T_R$) such that the resin temperature ($T_R$) exceeds the melt onset temperature ($T_{eim}$) while the thermoset resin 12 has a degree of cure ($D_C$) between about 10 percent and about 70 percent. In another particular example, the controlling (Block 120) the resin temperature ($T_R$) may include controlling the resin temperature ($T_R$) such that the resin temperature ($T_R$) exceeds the melt onset temperature ($T_{eim}$) while the thermoset resin 12 has a degree of cure ($D_C$) between about 20 percent and about 60 percent.

The heating (Block 110) the composite 10 to increase the resin temperature ($T_R$) of the thermoset resin 12 may include heating the composite 10 to increase the resin temperature ($T_R$) to a maximum cure temperature ($T_M$). In one particular example, the heating (Block 110) includes heating the composite 10 to a maximum cure temperature ($T_M$) that is at least 5° C. greater than the melt onset temperature ($T_{eim}$). In another particular example, the heating (Block 110) includes heating to a maximum cure temperature ($T_M$) that is at least 10° C. greater than the melt onset temperature ($T_{eim}$). In another particular example, the heating (Block 110) includes heating the composite 10 to a maximum cure temperature ($T_M$) that is at least 15° C. greater than the melt onset temperature ($T_{eim}$). In yet another particular example, the heating (Block 110) includes heating to a maximum cure temperature ($T_M$) that is at least 20° C. greater than the melt onset temperature ($T_{eim}$).

Referring to FIG. 2, shown is a composite 10 that may be manufactured in accordance with the method 100 of FIG. 1. The composite 10 may include the thermoset resin 12, the reinforcement material 14, and the thermoplastic additive 16. The reinforcement material 14 may include at least two plies 18, 20. Optionally, the thermoplastic additive 16 may be positioned between the two plies 18, 20.

In one particular example, the thermoset resin 12 may be (or may include) an epoxy. However, other thermoset resins 12 are contemplated and their use will not result in a departure from the scope of the present disclosure. Non-limiting examples of other suitable thermoset resins 12 include polyurethanes, polyester resins, benzoxazines, polyimides, and bismaleimides.

In one particular example, the reinforcement material 14 may be (or may include) carbon fiber. However, other reinforcement materials are contemplated and their use as the reinforcement material 14 will not result in a departure from the scope of the present disclosure. Non-limiting examples of other suitable reinforcement materials 14 include thermoset fibers, carbon nanotubes, glass fibers, ceramic fibers, and metallic fibers.

The thermoplastic additive 16 may be an interlayer, a veil, a mass of fibers/filaments, a film/sheet, a fabric (woven or nonwoven), or the like, and may be incorporated into the composite 10 for purposes of toughening of the composite 10. Compositionally, the thermoplastic additive 16 may be (or may include) a thermoplastic polymer. Examples of thermoplastic polymers that may be used in or as the thermoplastic additive 16 include, without limitation, polyamide, polyether ether ketone, polyether ketone, polyester, polyethersulfone, polyimide, polyurethane, polyolefin, polyethylene, polypropylene, polymethylpentene, polybutene-1, acrylic, poly(methyl methacrylate), and/or nylon.

The thermoplastic additive 16 may have a range of melt onset temperatures ($T_{eim}$). In one particular example, the melt onset temperature ($T_{eim}$) of the thermoplastic additive 16 may be at a temperature of at least about 150° C. In another particular example, the melt onset temperature ($T_{eim}$) of the thermoplastic additive 16 may be between a temperature of about 160° C. to about 190° C. In yet another particular example, the melt onset temperature ($T_{eim}$) of the thermoplastic additive 16 may be between a temperature of about 170° C. to about 180° C.

Figure 8:
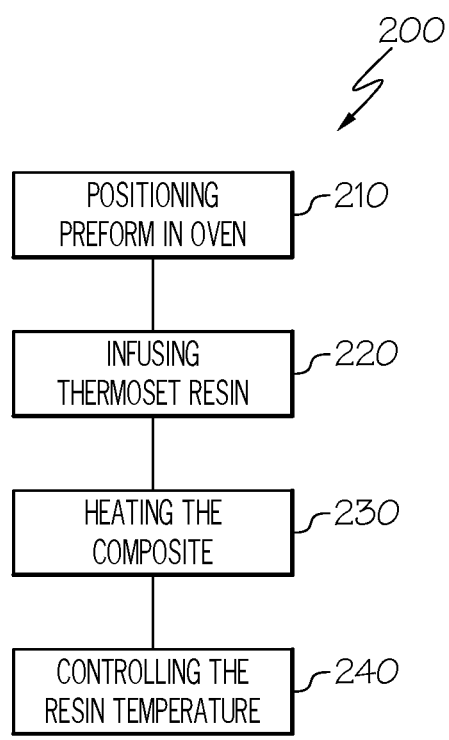
FIG. 8 is a flow diagram depicting another example of the disclosed method for curing a composite.
Figure 9:
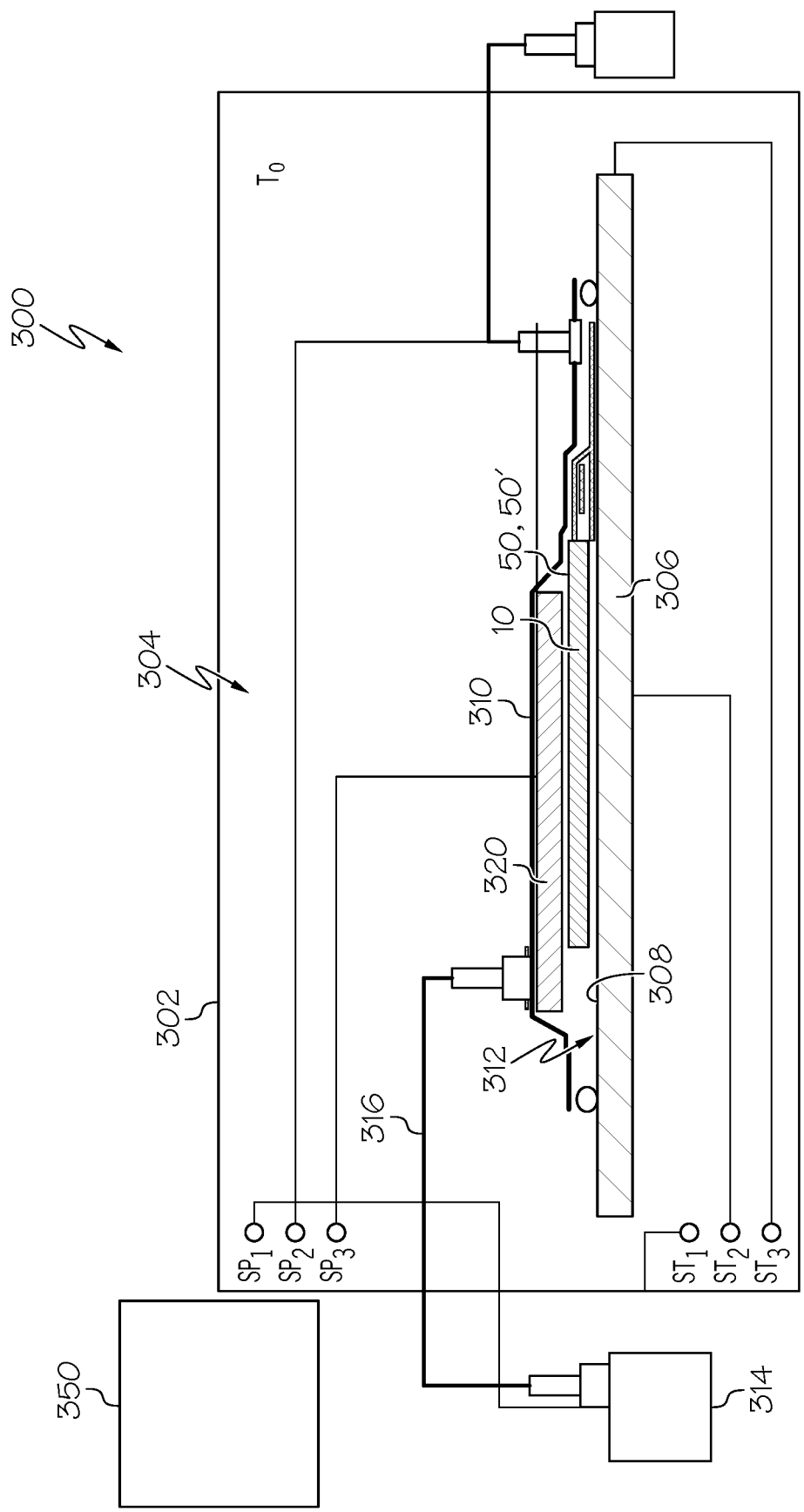
FIG. 9 is a schematic representation of one example of the disclosed system for curing a composite.

In one particular implementation, the method 100 may include the reinforcement material 14 and the thermoplastic additive 16 configured as a preform 50 (as shown in FIG. 9), and may further include infusing (Block 220 in FIG. 8) the thermoset resin 12 into the preform 50.

At this point, those skilled in the art will appreciate that the method 100 may result in a cured composite 10. The cured composite 10 may be a useful article, such as a vehicle (e.g., aircraft) component.

Referring to FIG. 8, shown is another example of the disclosed method 200 for curing a composite 10. As shown at Block 210, the method 200 may begin with the step of positioning into an oven 302 a preform 50. The preform 50 may include a reinforcement material 14 and a thermoplastic additive 16. The preform 50 may be substantially free of the thermoset resin 12 (i.e., the preform 50 may be a dry preform).

At Block 220, the method 200 may further include the step of infusing a thermoset resin 12 into the preform 50 to yield a resin-infused preform 50'. The infusing (Block 220) of thermoset resin 12 may be performed using a system, such as the system 300 shown in FIG. 9.

At Block 230, the method 200 may further include the step of heating the thermoset resin 12 and the resin-infused preform 50' to increase a resin temperature ($T_R$) of the thermoset resin 12. The heating (Block 230) may be performed by positioning the preform 50 into an oven 302, as shown in FIG. 9.

At Block 240, the method 200 may further include controlling the resin temperature ($T_R$) of the thermoset resin 12 such that the resin temperature ($T_R$) exceeds the melt onset temperature ($T_{eim}$) before the thermoset resin 12 achieves a degree of cure ($D_C$) of approximately 100 percent (i.e., greater than or equal to 98 percent), such as before the thermoset resin 12 achieves a degree of cure ($D_C$) between about 5 percent and 85 percent. The controlling (Block 240) may be performed during the heating (Block 230), such as by a controller 350, as shown in FIG. 9.

Referring to FIG. 9, shown is a schematic representation of one example of the disclosed system 300 for curing a composite 10. The system 300 may include an oven 302 having an oven temperature ($T_O$), a first temperature sensor ($S_{T1}$) positioned to sense the oven temperature ($T_O$), and a tool 306 positioned in the oven 302, the tool defining a tool surface 308 for supporting the composite 10 thereon.

The system 300 may further include a vacuum bag 310 coupled with the tool 306 to define an infusion volume 312 therebetween. A resin source 314 may be fluidly coupled (e.g., by fluid line 316) with the infusion volume 312 for supplying a thermoset resin 12 to the infusion volume 312. A second temperature sensor ($S_{T2}$) may be positioned to sense the resin temperature ($T_R$) of the thermoset resin 12 in the infusion volume 312.

The system 300 may further include a controller 350 in communication with the first temperature sensor ($S_{T1}$), the second temperature sensor ($S_{T2}$), and the oven 302. The controller 350 may control the resin temperature ($T_R$) of the thermoset resin 12 in the infusion volume 312 such that, during curing of the composite 10, the resin temperature ($T_R$) of the thermoset resin 12 in the infusion volume 312 exceeds the melt onset temperature ($T_{eim}$) prior to the thermoset resin 12 achieving a degree of cure ($D_C$) of about approximately 100 percent (i.e., greater than or equal to 98 percent), such as prior to the thermoset resin 12 achieving a degree of cure ($D_C$) between about 5 percent and 85 percent.

The system 300 may be configured or modified in various ways without departing from the scope of the present disclosure. In one example, the system 300 may be configured such that the controller 350 controls the resin temperature ($T_R$) of the thermoset resin 12 in the infusion volume 312 by at least partially controlling the oven temperature ($T_O$). In another example, the system 300 may be configured such that the controller 350 further controls a flow rate of the thermoset resin 12 flowing from the resin source 314 to the infusion volume 312. In another example, the system 300 may be configured such that the second temperature sensor ($S_{T2}$) indirectly senses the resin temperature ($T_R$) of the thermoset resin 12 in the infusion volume 312. In another example, the system 300 may be configured to include a flow media 320 positioned in the infusion volume 312 to facilitate resin distribution. In yet another example, the system 300 may be configured such that a preform 50 is positioned on the tool surface 308 of the tool 306, wherein the preform 50 includes the reinforcement material 14 and the thermoplastic additive 16.

EXAMPLES

Comparative Example

Figure 3:
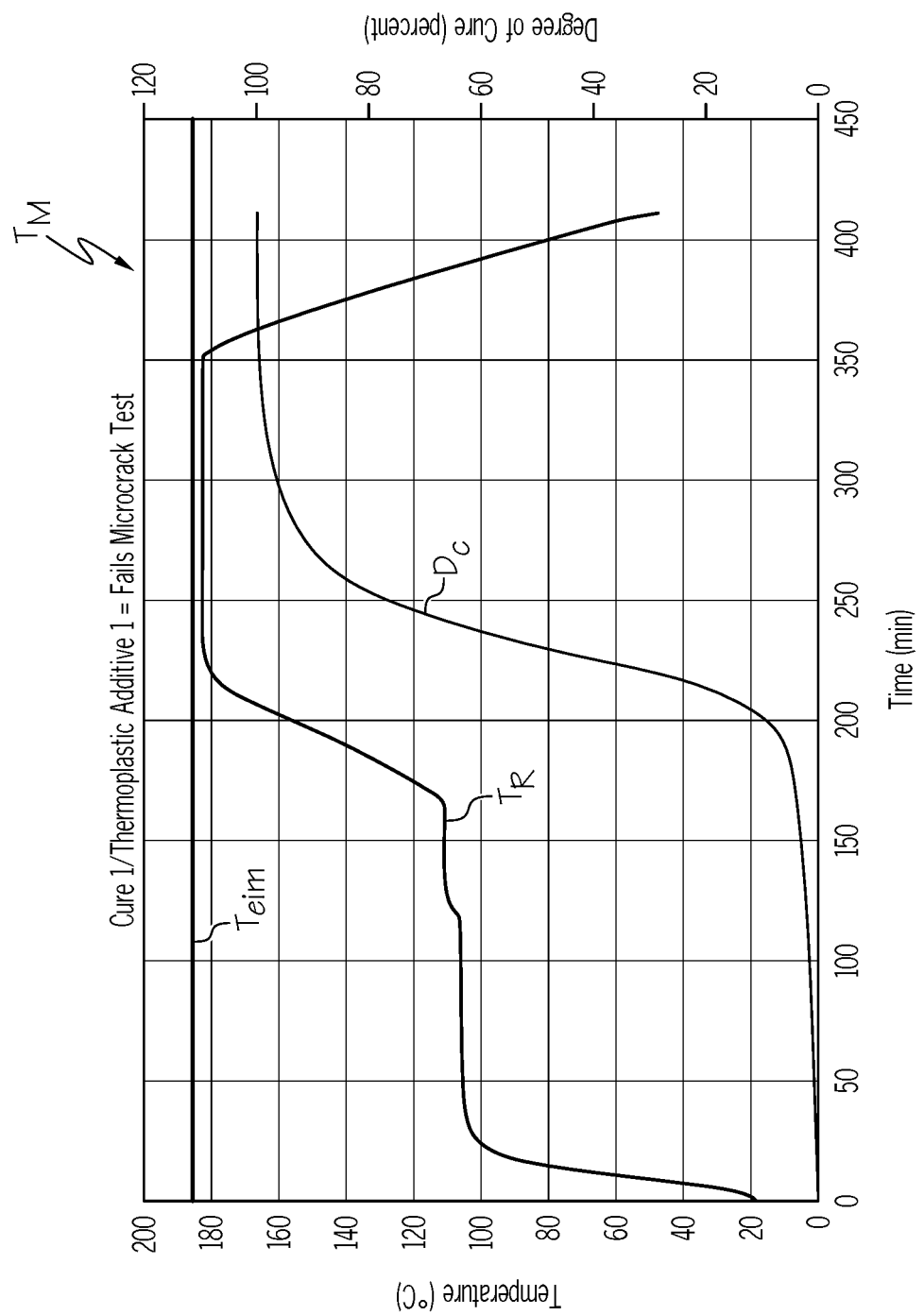
FIG. 3 is a graphical representation (temperature and degree-of-cure versus time) of a thermal cure cycle that was not performed in accordance with the method of FIG. 1.

Referring to FIG. 3, a graphical representation (temperature and degree-of-cure versus time) is shown of a thermal cure cycle that was not performed in accordance with the disclosed methods. The experiment was conducted by subjecting Thermoplastic Additive #1 to Cure Cycle #1. Thermoplastic Additive #1 polyamide.

Cure Cycle #1 included raising temperature over a period of time to achieve approximately 100 percent (i.e., greater than or equal to 98 percent) degree of cure ($D_C$), then allowing the sample to cool and be removed from the oven. The sample was then subjected to a microcrack test, and the example used in FIG. 3 failed the microcrack test.

The microcrack test involved a standardized thermal moisture cycling of the laminate between high and low temperatures for a high number of cycles in combination with periodic humidity conditioning. Testing was performed in an environmental chamber. Chamber temperature, laminate temperature and chamber humidity are recorded during the test. Presence of microcracks is determined by optical microscopy of cross-sections cut from laminate at completion of the microcrack test. A test is successful when there is no cracking that is systemic, detrimental or pervasive. Typically this means zero cracks apparent at the end of the test.

The graphical representation in FIG. 3 demonstrates that Thermoplastic Additive #1 approached but remained below (within about 2° C. to about 5° C.) the melt onset temperature ($T_{eim}$) of 185° C. prior to achieving approximately 100 percent (i.e., greater than or equal to 98 percent) degree of cure ($D_C$). The melt onset temperature ($T_{eim}$) for each thermoplastic additive used was determined in accordance with ASTM D3418. The degree of cure ($D_C$) was measured using computer modeling based on resin models built from actual Differential Scanning Calorimetry (DSC) testing of the resin.

Example 1

Figure 4:
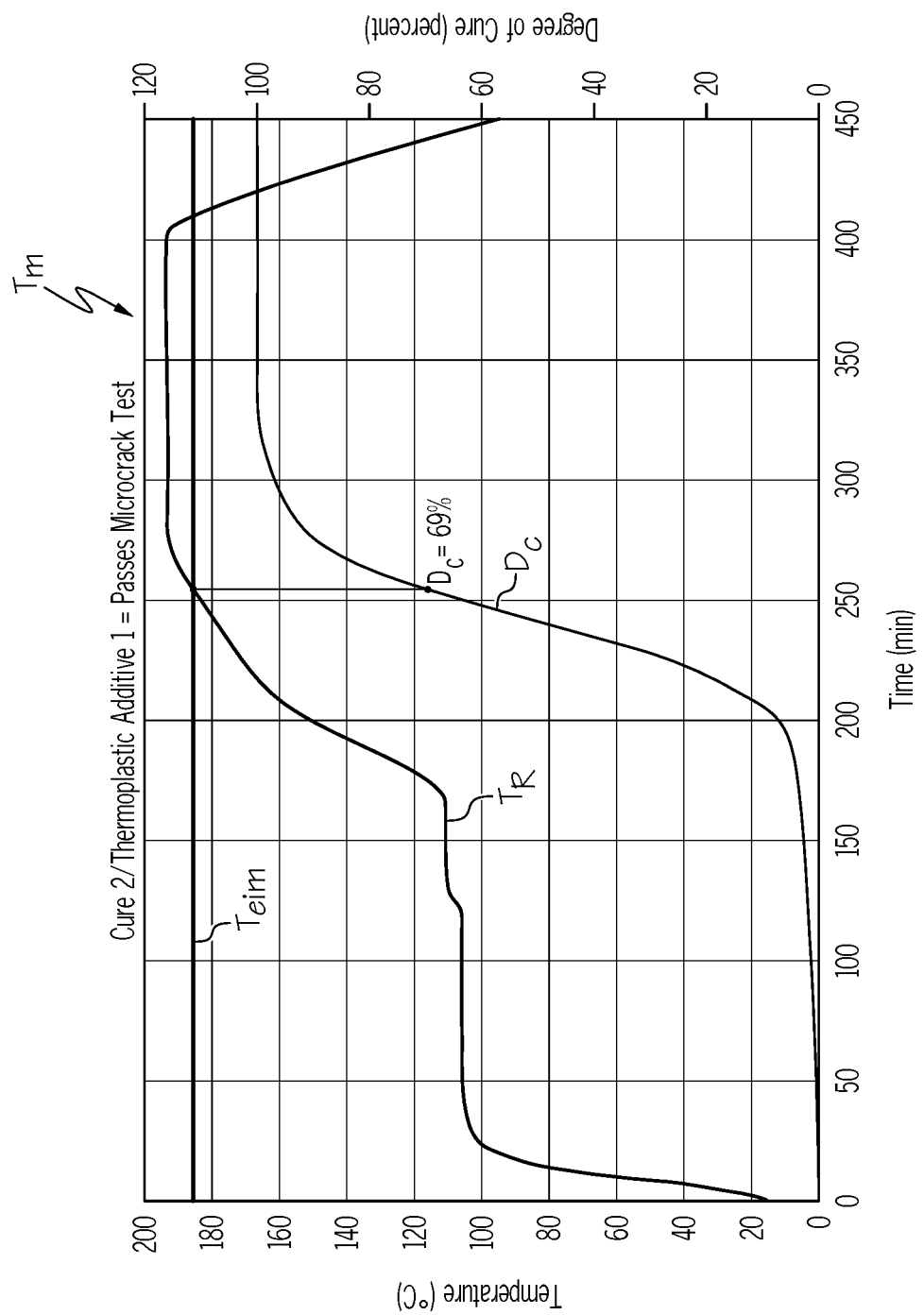
FIG. 4 is a graphical representation (temperature and degree-of-cure versus time) of one example thermal cure cycle that was performed in accordance with the method of FIG. 1.

Referring to FIG. 4, a graphical representation (temperature and degree-of-cure versus time) is shown of one example thermal cure cycle that was performed in accordance with the disclosed methods. The experiment was conducted by subjecting Thermoplastic Additive #1 to Cure Cycle #2.

Cure Cycle #2 included raising temperature over a period of time to achieve approximately 100 percent (i.e., greater than or equal to 98 percent) cure, then allowing the sample to cool down and be removed from the oven. The sample was then subjected to the microcrack test, and the example used in FIG. 4 passed the microcrack test. The graphical representation in FIG. 4 demonstrates that Thermoplastic Additive #1 exceeded the melt onset temperature ($T_{eim}$) of 185° C. (by about 6° C. to about 12° C.) prior to achieving approximately 100 percent (i.e., greater than or equal to 98 percent) degree of cure. The degree of cure ($D_C$) was 69 percent when the temperature of the Thermoplastic Additive #1 became equivalent to the melt onset temperature ($T_{eim}$).

Example 2

Figure 5:
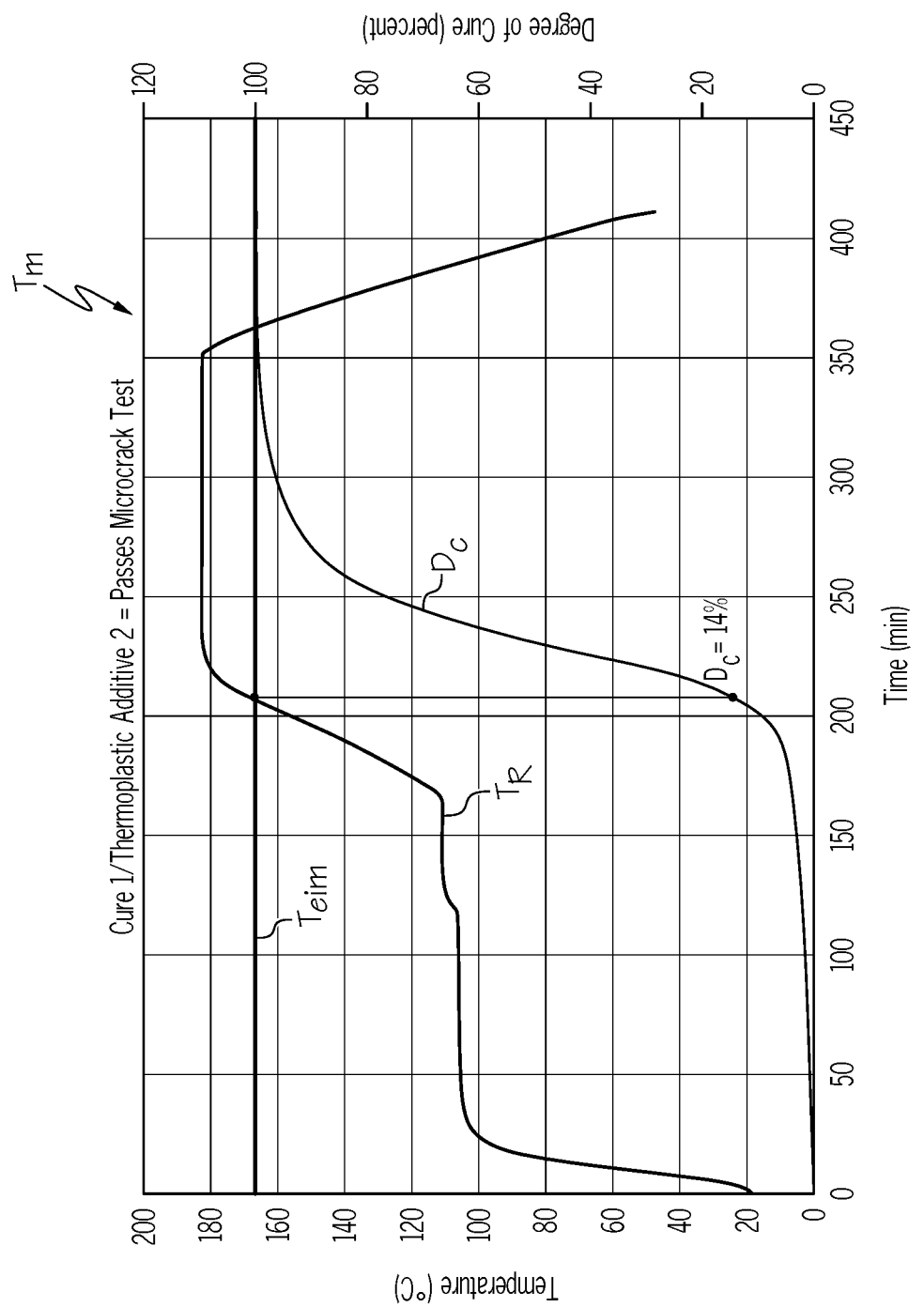
FIG. 5 is a graphical representation (temperature and degree-of-cure versus time) of another example thermal cure cycle that was performed in accordance with the method of FIG. 1.

Referring to FIG. 5, a graphical representation (temperature and degree-of-cure versus time) is shown of another example thermal cure cycle that was performed in accordance with the disclosed methods. The experiment was conducted by subjecting Thermoplastic Additive #2 to Cure Cycle #1. Thermoplastic Additive #2 polyamide.

After completing Cure Cycle #1, the sample was subjected to and passed the microcrack test. The graphical representation in FIG. 5 demonstrates that Thermoplastic Additive #2 exceeded the melt onset temperature ($T_{eim}$) of 168° C. (by about 12° C. to about 18° C.) prior to achieving approximately 100 percent (i.e., greater than or equal to 98 percent) degree of cure ($D_C$). The degree of cure ($D_C$) was 14 percent when the temperature of the Thermoplastic Additive #2 became equivalent to the melt onset temperature ($T_{eim}$).

Example 3

Figure 6:
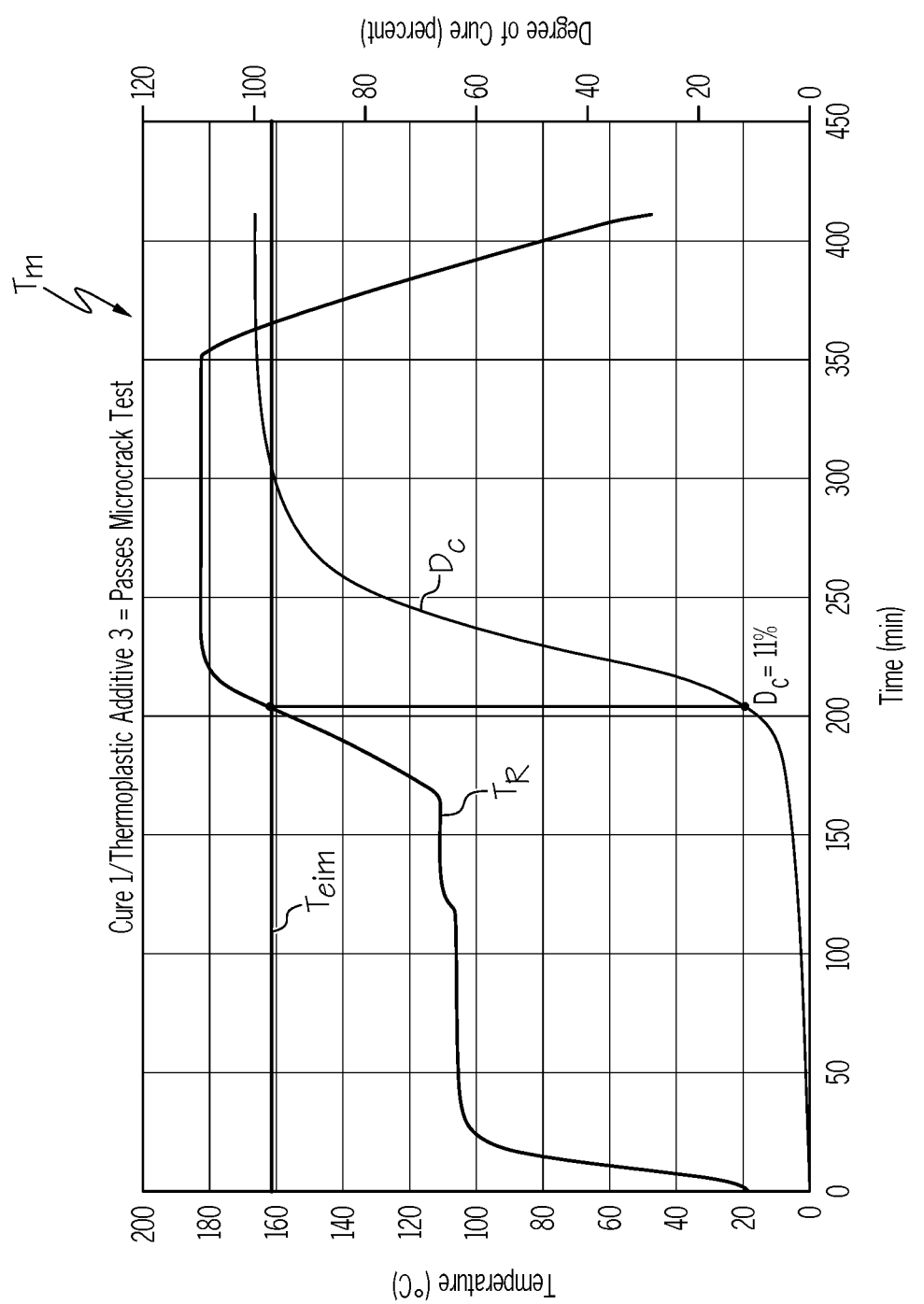
FIG. 6 is a graphical representation (temperature and degree-of-cure versus time) of another example thermal cure cycle that was performed in accordance with the method of FIG. 1.

Referring to FIG. 6, a graphical representation (temperature and degree-of-cure versus time) is shown of another example thermal cure cycle that was performed in accordance with the disclosed methods. The experiment was conducted by subjecting Thermoplastic Additive #3 to Cure Cycle #1. Thermoplastic Additive #3 is polyamide.

After completing Cure Cycle #1, the sample was subjected to and passed the microcrack test. The graphical representation in FIG. 6 demonstrates that Thermoplastic Additive #3 exceeded the melt onset temperature ($T_{eim}$) of 162° C. (by about 16° C. to about 22° C.) prior to achieving approximately 100 percent (i.e., greater than or equal to 98 percent) degree of cure. The degree of cure ($D_C$) was 11 percent when the temperature of the Thermoplastic Additive #3 became equivalent to the melt onset temperature ($T_{eim}$).

Example 4

Figure 7:
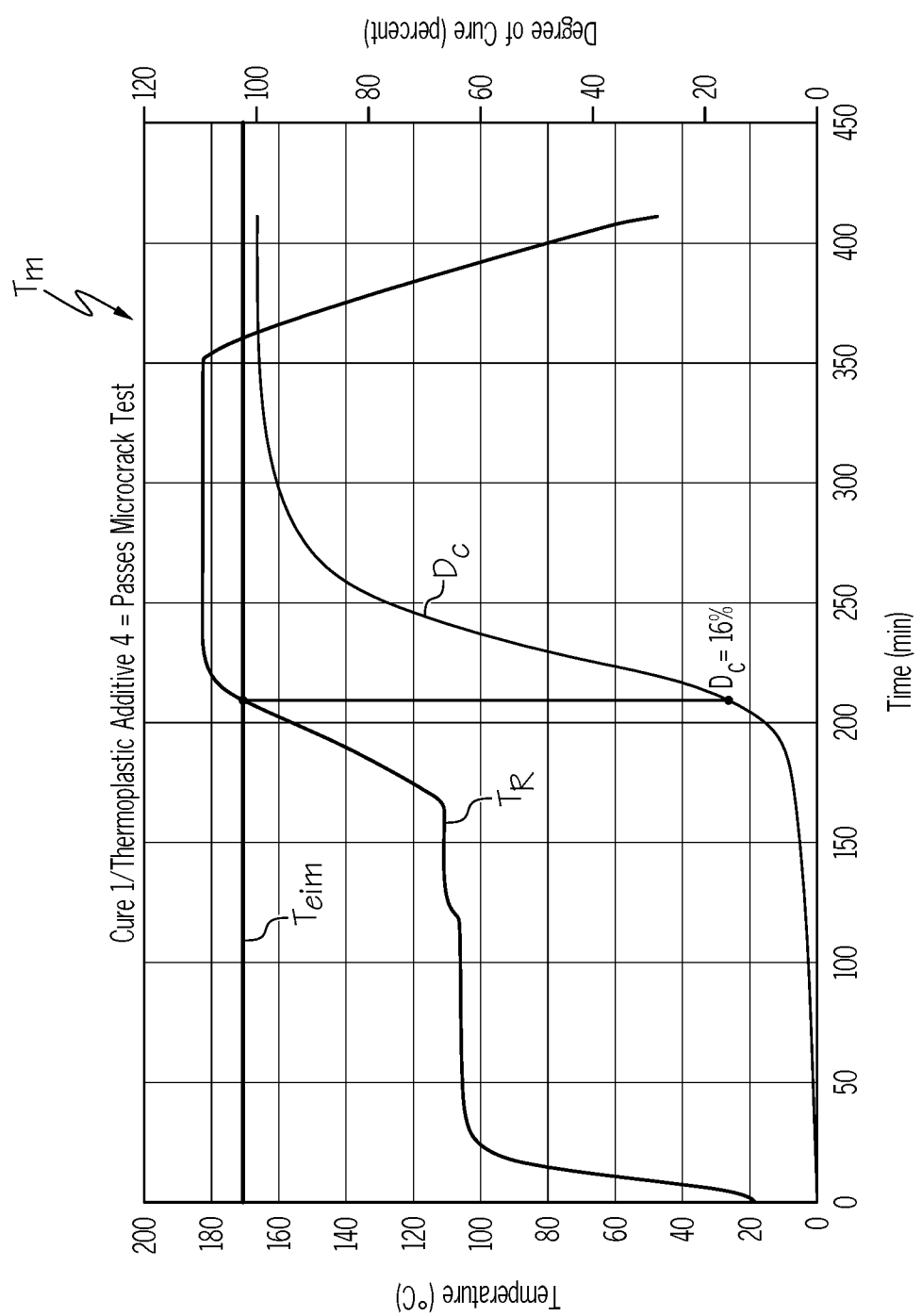
FIG. 7 is a graphical representation (temperature and degree-of-cure versus time) of yet another example thermal cure cycle that was performed in accordance with the method of FIG. 1.

Referring to FIG. 7, a graphical representation (temperature and degree-of-cure versus time) is shown of yet another example thermal cure cycle that was performed in accordance with the disclosed methods. The experiment was conducted by subjecting Thermoplastic Additive #4 to Cure Cycle #1. Thermoplastic Additive #4 is polyamide.

After completing Cure Cycle #1, the sample was subjected to and passed the microcrack test. The graphical representation in FIG. 7 demonstrates that Thermoplastic Additive #4 exceeded the melt onset temperature ($T_{eim}$) of 171° C. (by about 8° C. to about 12° C.) prior to achieving approximately 100 percent (i.e., greater than or equal to 98 percent) degree of cure. The degree of cure ($D_C$) was 0.16 when the temperature of the Thermoplastic Additive #4 became equivalent to the melt onset temperature ($T_{eim}$).

Taking together the data presented in FIGS. 3-7, when the thermoplastic additive is allowed to exceed the melt onset temperature ($T_{eim}$) before reaching a degree of cure ($D_C$) of approximately 100 percent (i.e., greater than or equal to 98 percent) there are significantly less microcracks (e.g., zero microcracks). At this point one skilled in the art will appreciate that different cure cycles and thermoplastic additives may be used to achieve these conditions without departing from the scope of the present disclosure.

Figure 10:
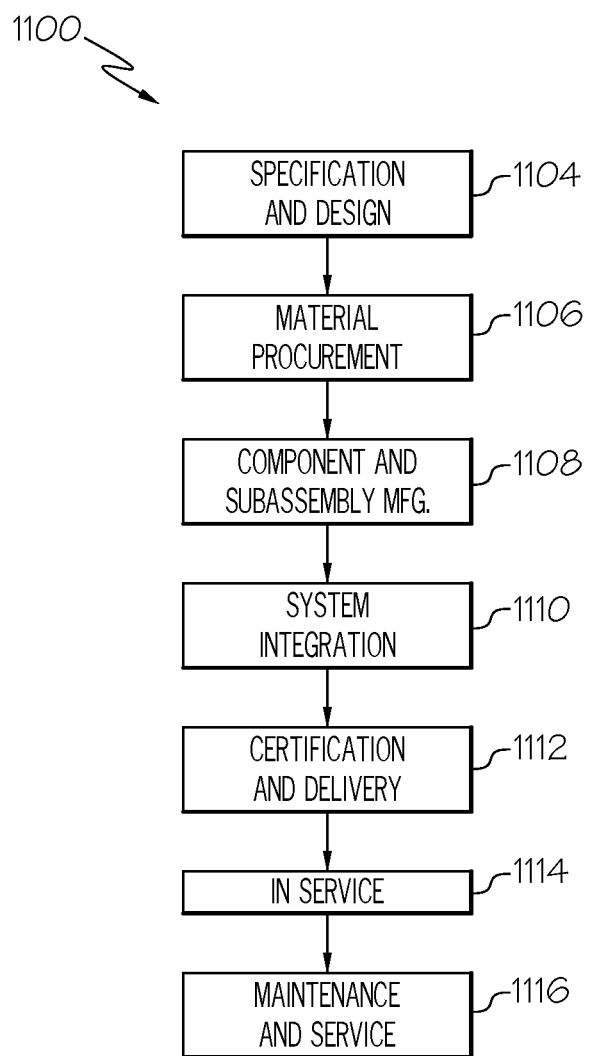
FIG. 10 is a flow diagram of an aircraft manufacturing and service methodology.
Figure 11:
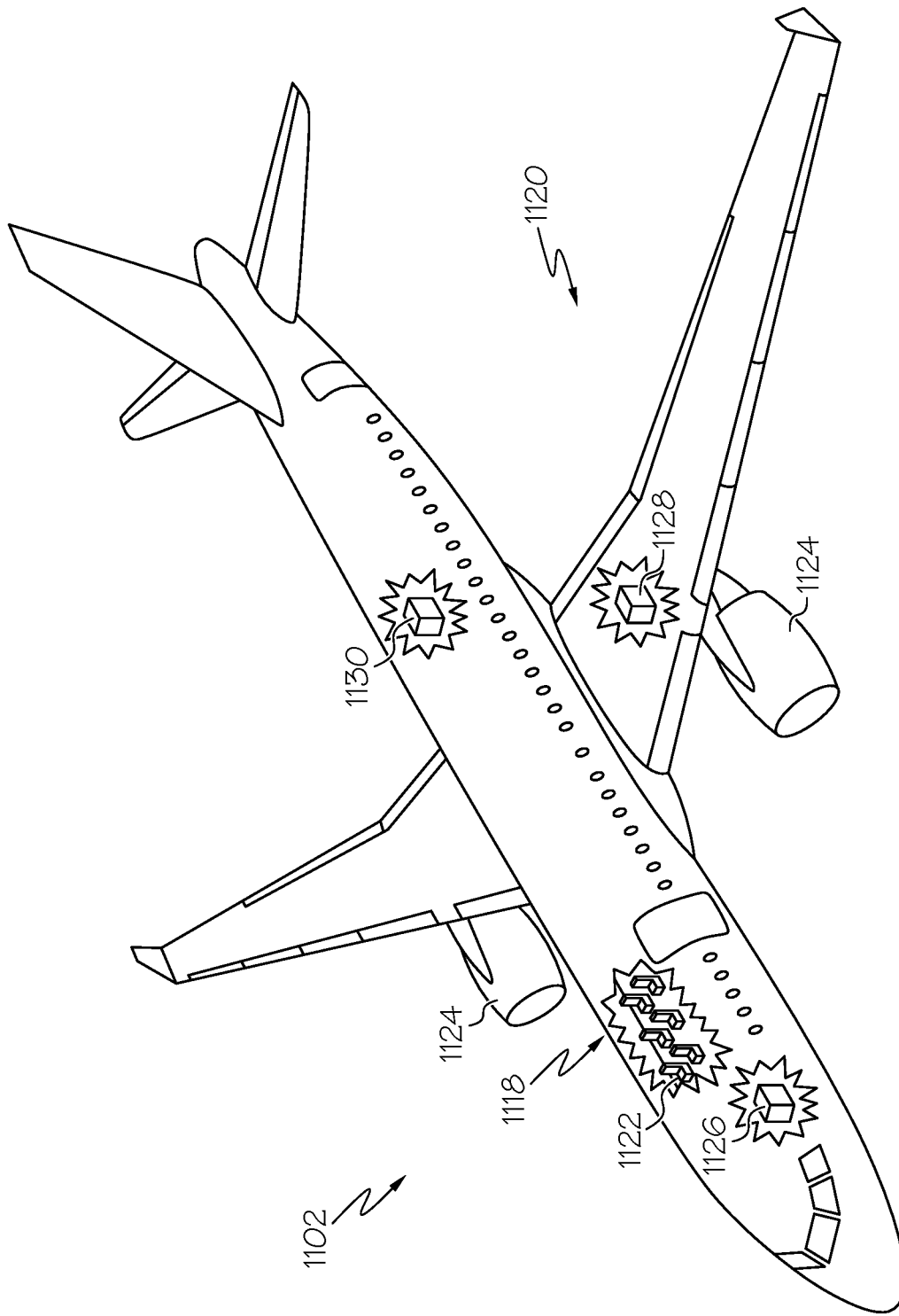
FIG. 11 is a block diagram of an aircraft.

Examples of the disclosure may be described in the context of an aircraft manufacturing and service method 1100, as shown in FIG. 10, and an aircraft 1102, as shown in FIG. 11. During pre-production, the aircraft manufacturing and service method 1100 may include specification and design 1104 of the aircraft 1102 and material procurement 1106. During production, component/subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116, which may also include modification, reconfiguration, refurbishment and the like.

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 1102 produced by example method 1100 may include an airframe 1118 with a plurality of systems 1120 and an interior 1122. Examples of the plurality of systems 1120 may include one or more of a propulsion system 1124, an electrical system 1126, a hydraulic system 1128, and an environmental system 1130. Any number of other systems may be included.

The disclosed methods and systems may be employed during any one or more of the stages of the aircraft manufacturing and service method 1100. As one example, components or subassemblies corresponding to component/subassembly manufacturing 1108, system integration 1110 and/or maintenance and service 1116 may be assembled using the disclosed methods and systems. As another example, the airframe 1118 may be constructed using the disclosed methods and systems. Also, one or more apparatus examples, method examples, or a combination thereof may be utilized during component/subassembly manufacturing 1108 and/or system integration 1110, for example, by substantially expediting assembly of or reducing the cost of an aircraft 1102, such as the airframe 1118 and/or the interior 1122. Similarly, one or more of system examples, method examples, or a combination thereof may be utilized while the aircraft 1102 is in service, for example and without limitation, to maintenance and service 1116.

Aspects of disclosed examples may be implemented in software, hardware, firmware, or a combination thereof. The various elements of the system, either individually or in combination, may be implemented as a computer program product tangibly embodied in a machine-readable storage device for execution by a processor. Various steps of examples may be performed by a computer processor executing a program tangibly embodied on a computer-readable medium to perform functions by operating on input and generating output. The computer-readable medium may be, for example, a memory, a transportable medium such as a compact disk or a flash drive, such that a computer program embodying aspects of the disclosed examples can be loaded onto a computer.

The above-described methods and systems are described in the context of an aircraft. However, one of ordinary skill in the art will readily recognize that the disclosed methods and systems are suitable for a variety of applications, and the present disclosure is not limited to aircraft manufacturing applications. For example, the disclosed methods and systems may be implemented in various types of vehicles including, for example, helicopters, passenger ships, automobiles, marine products (boat, motors, etc.) and the like. Non-vehicle applications are also contemplated.

Also, although the above-description describes methods and systems for curing composites and associated microcrack-resistant composites may enable manufacture of an airplane part in the aviation industry in accordance with various regulations (e.g., commercial, military, etc.), it is contemplated that the disclosed methods and systems may be implemented to facilitate manufacturing of a part in any industry in accordance with the applicable industry standards. The specific methods and systems can be selected and tailored depending upon the particular application.

Although various examples of the disclosed methods and systems for curing composites and associated microcrack-resistant composites have been shown and described, modifications may occur to those skilled in the art upon reading the specification. The present application includes such modifications and is limited only by the scope of the claims.

What is claimed is:

1. A method for curing a composite comprising a thermoset resin, a reinforcement material, and a thermoplastic toughening additive, the thermoplastic toughening additive comprising a melt onset temperature, the method comprising:
positioning into an oven a preform comprising the reinforcement material and the thermoplastic toughening additive;
within an infusion volume, infusing the thermoset resin into the preform to yield a resin-infused preform;
heating the resin-infused preform using the oven to increase a resin temperature of the thermoset resin;
during the heating, sensing the resin temperature of the thermoset resin within the infusion volume using a second temperature sensor positioned in thermal communication with the infusion volume and an oven temperature within the oven using a first temperature sensor in thermal communication with the oven; and
during the heating and based on the sensing, controlling the resin temperature such that the resin temperature exceeds the melt onset temperature of the thermoplastic toughening additive after the thermoset resin achieves a degree of cure of about 5 percent and prior to the thermoset resin achieving a degree of cure of 85 percent to resist formation of microcracks in the thermoset resin.

2. The method of claim 1 wherein the controlling the resin temperature comprises controlling the resin temperature such that the resin temperature exceeds the melt onset temperature prior to the thermoset resin achieving a degree of cure of about 75 percent.

3. The method of claim 1 wherein the controlling the resin temperature comprises controlling the resin temperature such that the resin temperature exceeds the melt onset temperature prior to the thermoset resin achieving a degree of cure of about 60 percent.

4. The method of claim 1 wherein the controlling the resin temperature comprises controlling the resin temperature such that the resin temperature exceeds the melt onset temperature prior to the thermoset resin achieving a degree of cure of about 50 percent.

5. The method of claim 1 wherein the controlling the resin temperature comprises controlling the resin temperature such that the resin temperature exceeds the melt onset temperature prior to the thermoset resin achieving a degree of cure of about 40 percent.

6. The method of claim 1 wherein the controlling the resin temperature comprises controlling the resin temperature such that the resin temperature exceeds the melt onset temperature prior to the thermoset resin achieving a degree of cure of about 20 percent.

7. The method of claim 1 wherein the controlling the resin temperature comprises controlling the resin temperature such that the resin temperature exceeds the melt onset temperature after the thermoset resin achieves a degree of cure of about 15 percent.

8. The method of claim 1 wherein the controlling the resin temperature comprises controlling the resin temperature such that the resin temperature exceeds the melt onset temperature only after the thermoset resin achieves a degree of cure of about 10 percent.

9. The method of claim 1 wherein the controlling the resin temperature comprises controlling the resin temperature such that the resin temperature exceeds the melt onset temperature while the thermoset resin comprises a degree of cure between about 5 percent and about 80 percent.

10. The method of claim 1 wherein the controlling the resin temperature comprises controlling the resin temperature such that the resin temperature exceeds the melt onset temperature while the thermoset resin comprises a degree of cure between about 10 percent and about 70 percent.

11. The method of claim 1 wherein the thermoset resin comprises an epoxy.

12. The method of claim 1 wherein the reinforcement material comprises carbon fiber.

13. The method of claim 1 wherein the reinforcement material comprises at least two plies, and wherein the thermoplastic additive is positioned between the two plies.

14. The method of claim 1 wherein the thermoplastic additive comprises a member selected from the group consisting of polyamide, polyether ether ketone, polyether ketone, polyester, polyethersulfone, polyimide, polyurethane, polyolefin, polyethylene, polypropylene, polymethylpentene, polybutene-1, acrylic, poly(methyl methacrylate), nylon, and combinations thereof.

15. The method of claim 1 wherein the melt onset temperature of the thermoplastic additive is a temperature between about 160° C. and about 190° C.

16. The method of claim 1 wherein the reinforcement material and the thermoplastic additive comprise a preform, and further comprising infusing the thermoset resin into the preform.

17. The method of claim 1 wherein the heating the composite to increase the resin temperature of the thermoset resin comprises heating the composite to increase the resin temperature to a maximum cure temperature, and wherein the maximum cure temperature is at least 5° C. greater than the melt onset temperature.

18. The method of claim 1 wherein the heating the composite to increase the resin temperature of the thermoset resin comprises heating the composite to increase the resin temperature to a maximum cure temperature, and wherein the maximum cure temperature is at least 10° C. greater than the melt onset temperature.

19. A method for curing a composite comprising a thermoset resin comprising an epoxy, a reinforcement material comprising carbon fiber, and a thermoplastic toughening additive, the thermoplastic toughening additive comprising a melt onset temperature between about 160° C. and about 190° C., the method comprising:
    positioning into an oven a preform comprising the reinforcement material and the thermoplastic toughening additive;
    within an infusion volume, infusing the thermoset resin into the preform to yield a resin-infused preform;
    heating the resin-infused preform using the oven to increase a resin temperature of the thermoset resin;
    during the heating, sensing the resin temperature of the thermoset resin within the infusion volume using a second temperature sensor positioned in thermal communication with the infusion volume and an oven temperature within the oven using a first temperature sensor in thermal communication with the oven; and
    during the heating and based on the sensing, controlling the resin temperature such that the resin temperature exceeds the melt onset temperature of the thermoplastic toughening additive while the thermoset resin comprises a degree of cure between about 5 percent and about 85 percent to resist formation of microcracks in the thermoset resin.

20. The method of claim 19 wherein the reinforcement material comprises at least two plies, and wherein the thermoplastic additive is positioned between the two plies.

* * * * *